US009982596B2

(12) United States Patent
Brendel et al.

(10) Patent No.: US 9,982,596 B2
(45) Date of Patent: May 29, 2018

(54) MULTI-JOINT CRANK DRIVE OF AN INTERNAL COMBUSTION ENGINE AND CORRESPONDING INTERNAL COMBUSTION ENGINE

(71) Applicant: AUDI AG, Ingolstadt (DE)

(72) Inventors: Matthias Brendel, Ingolstadt (DE); Markus Wild, Stammham (DE)

(73) Assignee: AUDI AG, Ingolstadt (DE)

( * ) Notice: Subject to any disclaimer, the term of this patent is extended or adjusted under 35 U.S.C. 154(b) by 0 days. days.

(21) Appl. No.: 15/036,626

(22) PCT Filed: Nov. 13, 2014

(86) PCT No.: PCT/EP2014/003036
§ 371 (c)(1),
(2) Date: May 13, 2016

(87) PCT Pub. No.: WO2015/070979
PCT Pub. Date: May 21, 2015

(65) Prior Publication Data
US 2016/0312694 A1    Oct. 27, 2016

(30) Foreign Application Priority Data

Nov. 14, 2013  (DE) .................. 10 2013 019 211
Feb. 18, 2014  (DE) .................. 10 2014 002 368

(51) Int. Cl.
*F02B 75/32*   (2006.01)
*F02B 75/04*   (2006.01)
(Continued)

(52) U.S. Cl.
CPC ............ *F02B 75/048* (2013.01); *F02D 15/02* (2013.01); *F16C 3/18* (2013.01); *F16J 1/14* (2013.01)

(58) Field of Classification Search
CPC .................. F02B 75/048; F02B 75/32
(Continued)

(56) References Cited

U.S. PATENT DOCUMENTS 4,517,931 A * 5/1985 Nelson .............. F02B 41/04
                                          123/197.4
6,615,773 B2 * 9/2003 Moteki .............. F02B 75/045
                                          123/197.4
(Continued)

FOREIGN PATENT DOCUMENTS

CN      102782287      11/2014
DE      44 37 132      5/1996
(Continued)

OTHER PUBLICATIONS

International Search Report issued by the European Patent Office in International Application PCT/EP2014/003036.
(Continued)

*Primary Examiner* — Marguerite McMahon
*Assistant Examiner* — James Kim
(74) *Attorney, Agent, or Firm* — Henry M. Feiereisen LLC

(57) ABSTRACT

A multi-joint crank drive of an internal combustion engine includes at least one coupling member supported on a crankpin of a crankshaft for rotation about a coupling member rotation axis; and at least one articulated connecting rod supported on a crankpin of an eccentric shaft for rotation about an eccentric rotation axis, wherein the at least one coupling member is connected with a piston connecting rod of a piston of the internal combustion engine for pivoting about a piston connecting rod rotation axis, and with the at least one articulated connecting rod for pivoting about an articulated connecting rod rotation axis, and wherein a rotation axis of the eccentric shaft is situated above a plane
(Continued)

which receives a rotation axis of the crankshaft and is perpendicular to at least one cylinder longitudinal center axis, and wherein, respectively in relation to a total travel of the piston.

14 Claims, 1 Drawing Sheet

(51) Int. Cl.
    *F02D 15/02*     (2006.01)
    *F16C 3/18*     (2006.01)
    *F16J 1/14*     (2006.01)

(58) Field of Classification Search
    USPC .................................. 123/197.1, 197.3, 48 B
    See application file for complete search history.

(56) References Cited

U.S. PATENT DOCUMENTS

| | | | |
|---|---|---|---|
| 6,772,717 B2 * | 8/2004 | Dachtchenko | F02B 75/048 123/48 B |
| 6,820,577 B2 * | 11/2004 | Yamada | F02B 63/02 123/185.14 |
| 6,820,586 B2 * | 11/2004 | Watanabe | F02B 41/04 123/197.1 |
| 6,843,212 B2 * | 1/2005 | Shimizu | F02B 63/02 123/48 B |
| 8,839,687 B2 * | 9/2014 | Inden | F02F 7/0019 123/197.3 |
| 8,978,616 B2 | 3/2015 | Brendel | |
| 2001/0017112 A1 | 8/2001 | Moteki et al. | |
| 2001/0039929 A1 | 11/2001 | Arai et al. | |
| 2002/0026910 A1 * | 3/2002 | Hiyoshi | F02B 75/045 123/48 B |
| 2003/0200942 A1 | 10/2003 | Dachtchenko et al. | |
| 2006/0137629 A1 * | 6/2006 | Mizuno | F02B 75/045 123/48 B |
| 2012/0285412 A1 | 11/2012 | Brendel et al. | |
| 2013/0207350 A1 * | 8/2013 | Kuwayama | F02F 5/00 277/434 |
| 2014/0137825 A1 | 5/2014 | Brendel | |
| 2014/0209054 A1 * | 7/2014 | Shimizu | F02B 25/04 123/197.3 |
| 2015/0330314 A1 | 11/2015 | Brendei et al. | |

FOREIGN PATENT DOCUMENTS

| | | |
|---|---|---|
| DE | 601 09 342 T2 | 4/2005 |
| DE | 601 19 833 T2 | 10/2006 |
| DE | 601 21 487 T2 | 11/2006 |
| DE | 10 2012 007 465 A1 | 10/2013 |
| EP | 1 143 127 | 10/2001 |
| EP | 1 180 588 A2 | 2/2002 |
| FR | 2 802 973 | 6/2001 |
| JP | 2000-073804 | 3/2000 |
| WO | WO 02/12694 A1 | 2/2002 |
| WO | WO 2013/152857 A2 | 10/2013 |

OTHER PUBLICATIONS

Chinese Search Report dated Nov. 14, 2017 with respect to counterpart Chinese patent application 201480061866.1.
Translation of Chinese Search Report dated Nov. 14, 2017 with respect to counterpart Chinese patent application 201480061866.1.

* cited by examiner

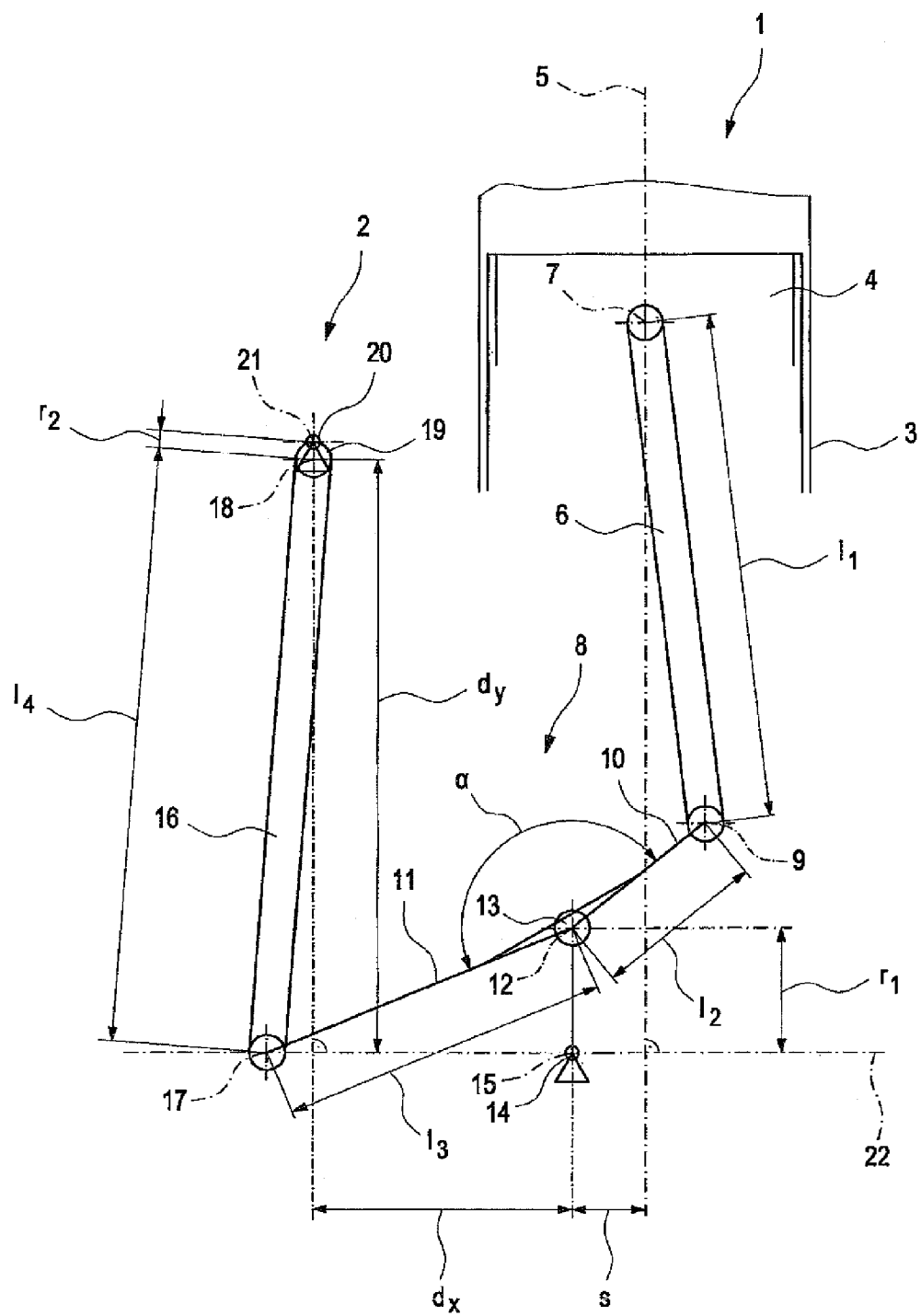

MULTI-JOINT CRANK DRIVE OF AN INTERNAL COMBUSTION ENGINE AND CORRESPONDING INTERNAL COMBUSTION ENGINE

CROSS-REFERENCES TO RELATED APPLICATIONS

This application is the U.S. National Stage of International Application No. PCT/EP2014/003036, filed Nov. 13, 2014, which designated the United States and has been published as International Publication No. WO 2015/070979 and which claims the priority of German Patent Application, Serial No. 10 2013 019 211.0, filed Nov. 14, 2013, and German Patent Application, Serial No. 10 2014 002 368.0, filed Feb. 18, 2014, pursuant to 35 U.S.C. 119(a)-(d).

BACKGROUND OF THE INVENTION

Invention relates to a multi-joint crank drive an internal combustion engine with at least one coupling member supported on a crankpin of a crankshaft for rotation about a coupling member rotation axis and at least one articulated connecting rod supported on a crankpin of an eccentric shaft for rotation about an eccentric rotation axis, wherein the coupling member is pivotally connected with a piston connecting rod of a piston of the internal combustion engine for pivoting about a piston connecting rod rotation axis, and is pivotally connected with the articulated connecting rod for pivoting about a articulated connecting rod rotation axis, and wherein a rotation axis of the eccentric shaft is situated above a rotation plane, which receives a rotation axis of the crankshaft and is perpendicular to at least one cylinder longitudinal center axis. The invention also relates to an internal combustion engine with a multi-joint crank drive.

The multi-joint crank drive of the above-mentioned type is for example part of the internal combustion engine but can also be used in other areas. The multi-joint crank drive includes the eccentric shaft, whose rotation angle can preferably be adjusted by means of an actuator, in particular in dependence of an operating point of the internal combustion engine. As an alternative the eccentric shaft can also be operatively connected with a crankshaft of the internal combustion engine and in this be driven by the internal combustion engine.

The multi-joint crank drive includes the coupling member, in particular a number of coupling members that correspond to the number of the pistons of the internal combustion engine. The coupling member or the coupling members are each rotatably supported on the corresponding crankpin of the crankshaft. Preferably the coupling member has two arms that protrude toward opposite sides over the crankshaft and which are provided at their ends with a pivot joint. The rotation axis of the coupling member about the crankshaft or about the crankpin of the crankshaft is referred to as coupling member rotation axis.

One of the pivot joints serves for pivotal connection with the piston connecting rod which connects one of the pistons of the internal combustion engine with the crankshaft via the coupling member. The rotation axis of this pivot joint is referred to as piston connecting rod rotation axis. Due to the pivotability of the coupling member the piston connecting rod rotation axis is not stationary but is displaced or pivoted together with the coupling member. One of the pivot joints serves for pivotal connection with the so-called articulated connecting rod, which is supported with its other end, which is opposite the coupling member, rotatably on the crankpin of the eccentric shaft. The rotation axis of this pivot joint is referred to as articulated connecting rod rotation axis, while the rotation axis of the articulated connecting rod on the crankpin of the eccentric shaft is hereinafter referred to as eccentric rotation axis.

The articulated connecting rod has for forming the pivot joints preferably two conrod eyes. The first conrod eye is a part of the pivot joint via which the articulated connecting rod interacts with the coupling member. The first conrod eye includes hereby for example a coupling pin or bearing pin, which is held on the coupling member. Analogously, the second conrod eye is a part of the pivot joint via which the articulated connecting rod is connected with the eccentric shaft. In particular the second conrod eye engages around at least regions of the crankpin of the eccentric shaft.

By means of the multi-joint crank drive the compression ratio in the cylinder that is respectively assigned to the piston can be adjusted, in particular in dependence on an operating point of the internal combustion engine and/or the current operating cycle. For adjusting the compression ratio the eccentric shaft is brought into an angular position, which corresponds to the desired compression ratio or the phase position between the eccentric shaft and the crankshaft is set to a defined value.

From the state of the art the publication DE 601 09 4342 T2 is known which describes an internal combustion engine with variable compression ratio and cylinder capacity. The publication DE 10 2012 007 465 A1 discloses an internal combustion engine in which the lateral distance between a rotation axis and a crankshaft and a third joint in relation to the maximal travel of the piston is at least −1.0.

Known multi-joint crank drives are usually configured so as to be optimized for mounting space. As a consequence the kinematically effective lengths of the multi-joint cranks drive in relation to the piston travel are comparatively small. The forces in the pivot joints of such a multi-joint crank drive are relatively great and have to travel over large pivot angles and with this a correspondingly long path. The generated friction work, which represents the product of force and traveled path and is converted into heat, is thus also high.

SUMMARY OF THE INVENTION

It is an object of the invention to propose a multi-joint crank drive of an internal combustion engine which compared to known multi-joint crank drives is configured advantageous in particular in that it reduces the friction of the multi-joint crank drive and/or the torsion stress which is exerted on the crankshaft of the internal combustion engine.

According to the invention this is achieved with a multi-joint crank drive with the features of the corresponding independent claim. Hereby it is provided that respectively in relation to a total lift of the piston the distance between the piston rotation axis and the piston connecting rid rotation axis is less than 1.41 and a t most 1.61 and the distance between the piston connecting rod rotation axis and the coupling member rotation axis is less than 0.38 and at most 0.58 and the distance between the coupling member rotation axis and the articulated connecting rod rotation axis is at least 0.82 and at most 1.02 and the distance between the articulated connecting rod rotation axis and the eccentric rotation axis is at least 1.63 and at most 1.83.

Of course alternatively it can also be provided that only the mentioned distance between the piston rotation axis and the piston connecting rod rotation axis or only the mentioned distance between the piston connecting rod rotation axis and the coupling member rotation axis or only the mentioned distance between the coupling member rotation axis and the articulated connecting rod rotation axis or only the mentioned distance between the articulated connecting rod rotation axis and the eccentric rotation axis is realized. Also any desired combination of the mentioned distances can be provided. For example at least two, in particular exactly two of the mentioned distances or at least three, in particular exactly three of the mentioned distances are realized.

Generally the rotation axis of the eccentric shaft is situated above the plane which receives the rotation axis of the crankshaft and is perpendicular to the at least one cylinder longitudinal center axis. The plane is thus defined together by the rotation axis of the crankshaft and the cylinder longitudinal center axis. In longitudinal direction of the internal combustion engine—in relation to the rotation axis of the crankshaft—the plane has the same position and direction as this rotation axis. At the same time it is perpendicular to the at least one cylinder longitudinal center axis, so that the cylinder longitudinal center axis is oriented in normal direction of the plane. The cylinder longitudinal center axis is assigned to a cylinder of the internal combustion engine and extends in longitudinal direction of the cylinder. The cylinder longitudinal center axis hereby for example extends along the longitudinal extent of the cylinder in its center point.

Of course the plane can also be perpendicular to multiple cylinder longitudinal center axes of multiple cylinders of the internal combustion engine, particularly preferably perpendicular to the cylinder longitudinal center axes of all cylinders of the internal combustion engine. The eccentric shaft is arranged so that its rotation axis is arranged above this plane. Particularly preferably the entire eccentric shaft, i.e., not only its rotation axis, is situated above this plane. For example the rotation axis of the eccentric shaft is directly adjacent to the plane, i.e., it adjoins this plane. As an alternative this is the case for the entire eccentric shaft. It can also be provided that the rotation axis of the eccentric shaft or the entire eccentric shaft is situated above the plane and is additional spaced apart form the plane.

The eccentric shaft is thus no longer located below with regard to a cylinder of the internal combustion engine but was rotated upwards including the articulated connecting rod. As a result the piston connecting rod and the articulated connecting rod advantageously substantially point in the same direction starting from the coupling member, i.e., in the direction of the piston or the cylinder. The articulated connecting rod starting from the coupling lever does thus not face away from the cylinder or the piston or is not opposite the piston relative to the coupling lever.

Surprisingly the mentioned distances between the rotation axes improved the phase position of the maximal inertia force and the crankshaft lever present at this time point in that the inertia force-dependent torsion module in the crankshaft decreases significantly, in particular by at least 10%, at least 20% or at least 30%. In addition or as an alternative in a multi-joint crank drive with the mentioned distances between the rotation axes, the pivot angles of the joints are smaller compared to other configurations. This leads to a reduced friction at the same piston travel of the piston.

The individual elements of the multi-joint crank drive, for example the coupling member, the articulated connecting rod and/or the piston connecting rid, may be are larger than in other configurations of the multi-joint crank drive, which are optimized for mounting space. However, the greater and with this heavier elements, especially at higher rotational speeds, generate higher inertia forces, but this would be compensated—at least regarding friction—by the advantage of the decreased pivot angle.

Of course the distance between the piston rotation axis and the piston connecting rod rotation axis—in relation to the total piston travel—can be at least 1.46 and at most 1.56 or at least 1.49 and at most 1.53, particularly preferably 1.51.

In addition or as an alternative the distance between the piston connecting rod rotation axis and the coupling member rotation axis—in relation to the total piston travel—can be at least 0.43 and at most 0.53, in particular at least 0.46 and at most 0.50, particularly preferably 0.48.

In a further embodiment it can be provided that the distance between the coupling member rotation axis and the articulated connecting rod rotation axis—in relation to the total travel of the piston—is at least 0.87 and at most 0.97, in particular at least 0.90 and at most 0.94, particularly preferably 0.92.

Finally it can be provided that the distance between the articulated connecting rod rotation axis and the eccentric shaft rotation axis 0 in relation to the total position travel—is at least 1.68 and at most 1.78 or at most 1.81, in particular at least 1.71 and at most 1.75 or at least 1.75 and at most 1.81, particularly preferably 1.73 or 1.78.

A further embodiment of the invention provides that in relation to the total piston travel the horizontal distance between the rotation axis of the eccentric shaft and the rotation axis of the crankshaft—in relation to the total piston travel—is at least 0.64 and at most 0.84. The horizontal distance is hereby for example defined in the direction that is perpendicular to the cylinder longitudinal center axis. The stated values are hereby understood as absolute values. For example the mentioned distance is at least 0.69 and at most 0.79, in particular at least 0.72 and at most 0.76 or at least 0.71 and at most 0.75, particularly preferably 0.74 or 0.73.

A further embodiment of the invention provides that, in relation to the total piston travel, the vertical distance between the rotation axis of the eccentric shaft and the rotation axis of the crankshaft is at least 1.67 and at most 2.07. The vertical distance is preferably defined in a direction that is parallel to the cylinder longitudinal center axis. Also in this case the stated values are to be understood as absolute values. Particularly preferably, however, the rotation axis of the eccentric shaft is situated above the rotation axis of the crankshaft i.e., starting from the crankshaft, in the direction of the piston or the cylinder. The stated distance is preferably at least 1.72 and at most 2.02, in particular 1.85 and at most 1.89 or at least 1.91 and at most 1.95, particularly preferably 1.87 or 1.93 in each case in relation to the total piston travel.

An embodiment of the invention provides that, in relation of the total piston travel, the distance between the coupling member rotation axis and the rotation axis of the crankshaft is at least 0.23 and at most 0.43. The stated distance corresponds to a crank radius of the crankshaft, i.e., to the distance between the crankpin of the crankshaft and the rotation axis of the crankshaft. The stated distance is preferably at least 0.28 and at most 0.38, in particular at least 0.31 and at most 0.35, particularly preferably 0.33.

In a particularly preferred embodiment of the invention it is provided that, in relation to the total piston travel, an offset is at least 0.11 and at most 0.31. The term offset means a parallel displacement of the rotation axis of the crankshaft relative to the cylinder longitudinal center axis or a piston longitudinal center axis. The rotation axis of the crankshaft at an offset of zero thus falls on the cylinder longitudinal center axis or the piston longitudinal center axis. At an offset of greater than zero on the other hand it is spaced apart from it. The offset is preferably at least 0.16 and at most 0.26 in particular at least 0.19 and at most 0.23, particularly preferably 0.21.

Hereby it can be provided that the offset is present on the counter-pressure side, in particular the rotation axis of the crankshaft is thus arranged on the side of the piston longitudinal center axis which faces the eccentric shaft. Generally it is possible that the offset is either provided on the pressure side or on the counter-pressure side. Of course both configurations are also possible within the scope of the invention. Particularly preferably, however, the offset is configured toward the counter pressure side.

A particularly preferred embodiment of the invention provides that a coupling angle between an imagined straight line through the coupling member rotation axis and the articulated connecting rod rotation axis on one hand and an imagined straight line through the coupling member rotation axis and the piston connecting rod rotation axis on the other hand is at least 140 degrees and at most 180 degrees. The coupling angle essentially describes the angle between the arms of the coupling member. A first one of the arms hereby connects the coupling member rotation axis with the articulated connecting rod rotation axis while another one of the arms connects the coupling member rotation axis and the piston connecting rod rotation axis.

The coupling angle is characterized by two imagined straight lines, wherein these imagined lines respectively extend through two of the mentioned rotation axes, i.e., the coupling member rotation axis and the articulated connecting rod rotation axis on one hand and the coupling member rotation axis and the piston connecting rod rotation axis on the other hand. The coupling angle is preferably at least 150 degrees and at most 170 degrees, in particular at least 155 degrees and at most 165 degrees, particularly preferably exactly 160 degrees. Important for reducing the pivot angles are the here described great coupling angles in combination with a comparatively long articulated connecting rod and an also relatively long piston connecting rod.

A further advantageous embodiment of the invention provides that, in relation to the total piston travel, the distance between the rotation axis of the eccentric shaft and the eccentric rotation axis is at least 0.045 and at most 0.065. The distance thus characterizes a crank radius of the eccentric shaft, i.e., a distance between the crankpin and the eccentric shaft and the rotation axis of the eccentric shaft. For example the mentioned distance is at least 0.050 and at most 0.060, in particular 0.051 and at most 0.057. Particularly preferably it is 0.055.

Finally it can be provided that the total piston travel is at least 70 mm and at most 120 mm. Of course the total piston travel can generally be configured in any desired manner and can be selected in dependence on an intended power of the internal combustion engine. However, it is for example between the stated values (these values included) or is at least 80 mm and at most 110 mm, in particular at least 90 mm and at most 100 mm. It can however also be at least 91 mm and at most 95 mm, particularly preferably 93.5 mm.

The invention also relates to an internal combustion engine with a multi-joint crank drive. Hereby it is provided that the multi-joint crank drive is configured according to the above description. The advantages of such a configuration of the multi-joint crank drive or the internal combustion engine have been mentioned above. The internal combustion engine as well as the multi-joint crank drive can be modified according to the description above, which is referenced here regarding these modifications.

BRIEF DESCRIPTION OF THE DRAWING

In the following the invention is explained in more detail by way of the embodiments shown in the drawing without limiting the invention. Hereby the sole FIGURE shows a schematic representation of an internal combustion engine with a multi-joint crank drive.

DETAILED DESCRIPTION OF PREFERRED EMBODIMENTS

The FIGURE shows a region of the internal combustion engine 1 with a multi-joint crank drive 2. The internal combustion engine 1 additionally has at least one piston 4, which is movably in longitudinal direction in a cylinder 3. The cylinder 3 or the piston 4 has a longitudinal center axis 5. A piston connecting rod 6 engages on the piston 4, and is supported on the piston 4 for rotation about a piston rotation axis 7. The piston rotation axis 7 is preferably located on the longitudinal center axis 5 of the cylinder 3.

On its side that faces away from the piston 4, the piston connecting rod 6 is connected with a coupling member 8. Hereby the piston connecting rod 6 is supported on the coupling member 8 for rotation about a piston connecting rod rotation axis 9. In particular the piston connecting rod 6 engages on a first arm 10 of the coupling member 8. This first arm is rigidly connected with a second arm 11 at an angle α. The angle α is formed about a coupling member rotation axis 12. The two arms 10 and 11 thus converge in this coupling member rotation axis 12. The coupling member 8 is supported on a crankpin 13 of a crankshaft 14 for rotation about the coupling member rotation axis 12. The crankpin 13 or the coupling member rotation axis 12 is hereby arranged eccentric relative to a rotation axis 15 of the crankshaft 14.

On the side of the coupling member 8, which faces away from the piston connecting rod 6, an articulated connecting rod 16 engages on the coupling member 8, i.e., in particular on the second arm 11. Hereby the articulated connecting rod 16 is supported on the coupling member 8 for rotation about an articulated connecting rod rotation axis 17. On the side of the articulated connecting rod 16, which faces away from the coupling member 8, the articulated connecting rod 16 is supported on a crankpin 19 of the eccentric shaft 20 for rotation about an eccentric rotation axis 18. The eccentric shaft 20 has a rotation axis 21. The crankpin 19 or the eccentric rotation axis 18 are eccentric to the rotation axis 21 of the eccentric shaft 20.

The rotation axis 21 of the eccentric shaft 20 is arranged above a plane 22, which receives the rotation axis 15 of the crankshaft 15 and is perpendicular to the cylinder longitudinal center axis 5. This arrangement is referred to as "above situated eccentric shaft".

In the FIGURE a distance between the piston rotation axis 7 and the piston connecting rod rotation axis 9 is designated $I_1$. The distance between the piston connecting rod rotation axis 9 and the coupling member rotation axis 12 is designated $I_2$. The distance between the coupling member rotation axis 12 and the articulated connecting rod rotation axis 17 is designated $I_3$ and the distance between the articulated connecting rod rotation axis 17 and the eccentric rotation axis 18 is designated $I_4$. Particularly advantageously the following relationship between these distances applies:

$$1.41 \leq I_1 \leq 1.61,$$

$$0.38 \leq I_2 \leq 0.58,$$

$0.82 \leq I_3 \leq 1.02$, and $1.635 \leq I_4 \leq 1.83$.

The stated values are hereby in relation to a total travel of the piston 4, which is for example at least 70 mm and at most 120 mm.

It can further be provided that a horizontal distance $d_x$ between the rotation axis 21 of the eccentric shaft 20 and the rotation axis 15 of the crankshaft 14 in relation to the total piston travel of the piston 4 is at least 064 and at most 0.84. In addition or as an alternative the vertical distance $d_y$ between the rotation axis 21 of the eccentric shaft 20 and the rotation axis 15 of the crankshaft 14 is at least 1.64 and at most 2.07, again in relation to the total piston travel.

It can further be provided that in relation to the total piston travel the crank radius of the crankshaft 14, i.e., the distance between the coupling member rotation axis 12 and the rotation axis 15 of the crankshaft 14, is at least 0.23 and at most 0.43. This crank radius is here referred to as $r_1$. Also the eccentric shaft 20 has a travel, which is referred to as $r_2$ and is defined as the distance between the eccentric rotation axis 18 and the rotation axis 21 of the eccentric shaft 20. The crank radius $r_2$ of the eccentric shaft 20 is—in relation to the total piston travel—for example at least 0.045 and at most 0.065.

In addition in the here described multi-joint crank drive 2 an offset s can be provided, which insofar is defined as the horizontal distance between the rotation axis 15 of the crankshaft 14 and the cylinder longitudinal center axis 5. The offset s is defined in relation to the total piston travel for example at least 0.11 and at most 0.31. Hereby the offset s is situated on the counter-pressure side. The rotation axis 15 of the crankshaft 14 is thus arranged on the side of the longitudinal center axis 5 on which the rotation axis 21 of the eccentric shaft 20 is situated.

The coupling angle α mentioned above is defined by the sectional angle between an imagined straight line, which extends through the coupling member rotation axis 12, and the articulated connecting rod rotation axis 17, and an imagined straight line, which extends through the coupling member rotation axis 12 and the piston connecting rod rotation axis 9. The coupling angle α is for example at least 140 degrees and at most 180 degrees, it can however of course generally be selected arbitrarily.

The here illustrated internal combustion engine 1 has of course preferably multiple cylinders 3 and thus multiple pistons 3. Correspondingly the multi-joint crank drive 2 has multiple of the elements assigned to it, in particular for each piston 4 a piston connecting rod 6, a coupling member 8 and an articulated connecting rod 16. These mentioned elements are configured according to the description above. Generally the number of the cylinders 3 or the pistons of the internal combustion engine 1 can be selected arbitrarily. In particular it is 2, 3, 4, 5, 6, 8 or 12. When the internal combustion engine 1 is equipped with four cylinders the crank angle of the crankshaft 14 is preferably 180 degrees.

What is claimed is:

1. A multi-joint crank drive of an internal combustion engine, comprising
    at least one coupling member supported on a crankpin of a crankshaft for rotation about a coupling member rotation axis; and
    at least one articulated connecting rod supported on a crankpin of an eccentric shaft for rotation about an eccentric rotation axis, wherein the at least one coupling member is connected with a piston connecting rod of a piston of the internal combustion engine for pivoting about a piston connecting rod rotation axis, and with the at least one articulated connecting rod for pivoting about an articulated connecting rod rotation axis, and wherein a rotation axis of the eccentric shaft is situated above a plane which receives a rotation axis of the crankshaft and is perpendicular to at least one cylinder longitudinal center axis, and wherein, respectively in relation to a total travel of the piston,
    a distance between the piston rotation axis and the piston connecting rod rotation axis is at least 1.41 and at most 1.61 in relation to the total travel of the piston,
    a distance between the piston connecting rod rotation axis and the coupling member rotation axis is at least 0.38 and at most 0.58 in relation to the total travel of the piston,
    a distance between the coupling member rotation axis and the articulated connecting rod rotation axis is at least 0.82 and at most 1.02 in relation to the total travel of the piston, and
    a distance between the articulated connecting rod rotation axis and the eccentric rotation axis is at least 1.63 and at most 1.83 in relation to the total travel of the piston,
    wherein the articulated connecting rod has a length which is greater than a length of the piston connecting rod.

2. The multi-joint crank drive of claim 1, wherein in relation to the total piston travel, a horizontal distance between the rotation axis of the eccentric shaft and the rotation axis of the crankshaft is at least 0.64 and at most 0.84.

3. The multi-joint crank drive of claim 1, wherein, in relation to the total piston travel a vertical distance between the rotation axis of the eccentric shaft and the rotation axis of the crankshaft is at least 1.67 and at most 2.07.

4. The multi-joint crank drive of claim 1, wherein in relation to the total piston travel a distance between the coupling member rotation axis and the rotation axis of the crankshaft is at least 0.23 and at most 0.43.

5. The multi-joint crank drive of claim 1, wherein the rotation axis of the crankshaft and the cylinder longitudinal center axis extend in relation to the total travel of the piston at an offset between the is at least 0.11 and at most 0.31.

6. The multi-joint crank drive of claim 5, wherein the offset is present toward a counter pressure side.

7. The multi-joint crank drive of claim 1, wherein a coupling angle between a first imagined straight line through the coupling member rotation axis and the articulated connecting rod rotation axis and a second imagined straight line through the coupling member ration axis and the piston connecting rod rotation axis is at least 140 degrees and at most 180 degrees.

8. The multi-joint crank drive of claim 1, wherein in relation to the total piston travel a distance between the rotation axis of the eccentric shaft and the eccentric rotation axis is at least 0.045 and at most 0.065.

9. The multi-joint crank drive of claim 1, wherein the total travel of the piston is at least 70 mm and at most 120 mm.

10. An internal combustion engine, comprising a multi-joint crank drive of an internal combustion engine, said multi-joint crank drive comprising
    at least one coupling member supported on a crankpin of a crankshaft for rotation about a coupling member rotation axis; and at least one articulated connecting rod supported on a crankpin of an eccentric shaft for rotation about an eccentric rotation axis, wherein the at least one coupling member is connected with a piston connecting rod of a piston of the internal combustion engine for pivoting about a piston connecting rod rotation axis, and with the at least one articulated connecting rod for pivoting about an articulated connecting rod rotation axis, and wherein a rotation axis of the eccentric shaft is situated above a plane which receives a rotation axis of the crankshaft and is perpendicular to at least one cylinder longitudinal center axis, and wherein, respectively in relation to a total travel of the piston, a distance between the piston rotation axis and the piston connecting rod rotation axis is at least 1.41 and at most 1.61 in relation to the total travel of the piston, a distance between the piston connecting rod rotation axis and the coupling member rotation axis is at least 0.38 and at most 0.58 61 in relation to the total travel of the piston, a distance between the coupling member rotation axis and the articulated connecting rod rotation axis is at least 0.82 and at most 1.02 61, and a distance between the articulated connecting rod rotation axis and the eccentric rotation axis is at least 1.63 and at most 1.83 in relation to the total travel of the piston, wherein the articulated connecting rod has alength which is greater than a length of the piston connecting rod.

11. The multi-joint crank drive of claim 1, wherein the length of the articulated connecting rod is greater than a length of the coupling member.

12. The multi-joint crank drive of claim 10, wherein the length of the articulated connecting rod is greater than a length of the coupling member.

13. The multi-joint crank drive of claim 1, wherein the length of the piston connecting rod is greater than a length of the coupling member.

14. The multi-joint crank drive of claim 10, wherein the length of the piston connecting rod is greater than a length of the coupling member.

\* \* \* \* \*

UNITED STATES PATENT AND TRADEMARK OFFICE
CERTIFICATE OF CORRECTION

PATENT NO. : 9,982,596 B2
APPLICATION NO. : 15/036626
DATED : May 29, 2018
INVENTOR(S) : Brendel et al.

It is certified that error appears in the above-identified patent and that said Letters Patent is hereby corrected as shown below:

On the Title Page

Item (72), should read:
Matthias Brendel, Ingolstadt, (DE);
Markus Wild, Stammham, (DE);
Markus Meyer, Mildenau, (DE)

Signed and Sealed this
Twenty-fourth Day of May, 2022

Katherine Kelly Vidal
*Director of the United States Patent and Trademark Office*